(12) United States Patent
Kakimoto et al.

(10) Patent No.: US 6,532,853 B1
(45) Date of Patent: Mar. 18, 2003

(54) TABLE-TOP CUTTING MACHINE

(75) Inventors: Kazuhiro Kakimoto; Tatsuya Akamatsu, both of Fuchu (JP)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 09/515,903

(22) Filed: Feb. 29, 2000

(51) Int. Cl.⁷ ................................................. B26D 1/14
(52) U.S. Cl. ..................... 83/698.11; 83/581; 83/471.3; 83/699.51; 83/473
(58) Field of Search ................................ 83/581, 468.3, 83/468.7, 468.6, 471.3, 477, 471.1, 698.41, 698.51, 698.11, 699.51, 473, 477.2, 477.1; 144/287, 1

(56) References Cited

U.S. PATENT DOCUMENTS

| | | | | |
|---|---|---|---|---|
| 5,383,382 A | * | 1/1995 | Garuglieri et al. | 83/581 |
| 5,437,214 A | * | 8/1995 | Sasaki et al. | 83/698.41 |
| 5,497,816 A | * | 3/1996 | Darland | 144/287 |
| 5,582,089 A | * | 12/1996 | Sasaki et al. | 83/581 |
| 5,870,938 A | * | 2/1999 | Brunson et al. | 83/471.3 |
| 5,870,939 A | * | 2/1999 | Matsubara | 83/581 |
| 6,016,732 A | * | 1/2000 | Brault et al. | 83/581 |

* cited by examiner

*Primary Examiner*—Boyer Ashley
*Assistant Examiner*—Omar Flores-Sánchez
(74) *Attorney, Agent, or Firm*—Brooks & Kushman P.C.

(57) ABSTRACT

A table-top cutting machine having a base; a circular saw main unit having a saw blade and a drive therefor, the circular saw main unit being moveable between a precutting and a postcutting position and being pivotable to incline the saw blade. A turntable is also provided and is rotatably supported by the base. Locking mechanisms maintain the positions of the circular saw main unit and of the turntable and are operated by handles disposed at the front of the turntable. A stop is also provided to set and maintain the circular saw main unit with its saw blade in a vertical position. This mechanism is likewise operated by a handle disposed at the front of the turntable.

6 Claims, 14 Drawing Sheets

TABLE-TOP CUTTING MACHINE

TECHNICAL FIELD

The present invention relates generally to table-top cutting machines and more specifically to those having inclinable saw blades and rotatable turntables that are lockable in a plurality of positions and having a stop to set and maintain a saw blade in a vertical position.

BACKGROUND ART

One example of a conventional table-top cutting machine which is popularly used is a table-top cutting machine which comprises a base, a circular saw main unit which is attached to the base to move between a cutting wait, or precutting, position and a cutting complete, or postcutting, position along a plane of a saw blade and incline along a plane which is perpendicular to the plane of the saw blade, and an inclination locking mechanism for fixing and releasing an inclination of the circular saw main unit.

Another example of a conventional table-top cutting machine is a table-top cutting machine which comprises a base, a turntable which is rotatably attached to the base, a circular saw main unit which is attached to the turntable to move between a precutting position and a postcutting position along a plane of a saw blade and incline along a plane which is perpendicular to the plane of the saw blade, a miter, or turntable, locking mechanism for fixing the turntable to the base and releasing the turntable from the base, and an inclination locking mechanism for fixing and releasing an inclination of the circular saw main unit.

Another example of a conventional table-top cutting machine is a table-top cutting machine which comprises a base, a circular saw main unit which is attached to the base to move between a precutting position and a postcutting position along a plane of a saw blade and incline along a plane which is perpendicular to the plane of the saw blade, an inclination locking mechanism for fixing and releasing an inclination of the circular saw main unit, and an inclination stopping mechanism for stopping an inclination of the circular saw main unit when the saw blade is positioned upright as the circular saw main unit inclines from one side to the other side.

In the abovementioned table-top cutting machines, an inclination of the circular saw main unit is fixed and released by manipulating an inclination locking operation handle. In addition, when the circular saw main unit inclines from one side to the other side, as the saw blade stands upright, the inclination stopping mechanism prevents inclination of the circular saw main unit so that the saw blade is maintained in the upright position. In order to incline the circular saw main unit further to the other side from this condition, an inclination stopping operation handle is manipulated so that the inclination stopping mechanism is released.

However, in a conventional table-top cutting machine as described above, since the inclination locking operation handle for the inclination locking mechanism and the inclination stopping operation handle for the inclination stopping mechanism are disposed on the rear side at the base, an operator must move behind, the table-top cutting machine to manipulate the handles, which is extremely troublesome.

Further, although an operator can stretch his arm to the rear side of the base and manipulate the handles while staying in front of the table-top cutting machine, it is difficult to confirm visually the positions of the handles in this manner, and therefore, the operator must manipulate the handles after confirming the positions of the handles with his hands, which markedly reduces the operability. Moreover, the operator may have his hand caught by members which are disposed in the vicinity of the saw blade when he stretches his arm behind the base in an effort to manipulate the handles. Particularly, if in the case no safety cover is disposed near the saw blade, the operator's hand may directly touch the saw blade and be severely injured.

DISCLOSURE OF INVENTION

Accordingly, an object of the present invention is to provide a table-top cutting machine which allows one to manipulate an inclination locking mechanism and/or an inclination stopping mechanism dependably and in an extremely easy fashion.

A first aspect of the present invention is directed to a table-top cutting machine which comprises a base; a circular saw main unit which is attached to the base to move between a precutting position and a postcutting position along a plane of a saw blade and incline along a plane which is perpendicular to the plane of the saw blade; and an inclination locking mechanism for fixing and releasing an inclination of the circular saw main unit, wherein an inclination locking operation handle for the inclination locking mechanism is disposed to a front side of the base.

A second aspect of the present invention is directed to a table-top cutting machine which comprises a base; a turntable which is rotatably attached to the base; a circular saw main unit which is attached to the turntable to move between a precutting position and a postcutting position along a plane of a saw blade and incline along a plane which is perpendicular to the plane of the saw blade; a turntable locking mechanism for fixing the turntable to the base and releasing the turntable from the base; and an inclination locking mechanism for fixing and releasing an inclination of the circular saw main unit, wherein a turntable locking operation handle for the turntable locking mechanism is disposed to a front side of the turntable, and an inclination locking operation handle for the inclination locking mechanism is disposed to the front side of the turntable.

According to a third aspect of the present invention, in the table-top cutting machine of the second aspect, a turntable locking shaft for the turntable locking mechanism and an inclination locking shaft for the inclination locking mechanism are disposed coaxially at a distance from each other through a holding means in such a manner that the turntable locking shaft and the inclination locking shaft do not contact each other, and the turntable locking operation handle is attached to one end of the turntable locking shaft while the inclination locking operation handle is attached to one end of the inclination locking shaft.

A fourth aspect of the present invention is directed to a table-top cutting machine which comprises a base; a circular saw main unit which is attached to the base to move between a precutting position and a postcutting position along a plane of a saw blade and incline along a plane which is perpendicular to the plane of the saw blade; an inclination locking mechanism for fixing and releasing an inclination of the circular saw main unit; and an inclination stopping mechanism for maintaining an inclination of the circular saw main unit when the saw blade is positioned upright as the circular saw main unit inclines from one side to the other side, wherein an inclination stopping operation handle for the inclination stopping mechanism is disposed to a front side of the base.

A fifth aspect of the present invention is directed to a table-top cutting machine which comprises a base; a turntable which is rotatably attached to the base; a circular saw main unit which is attached to the turntable to move between a precutting position and a postcutting position along a plane of a saw blade and incline along a plane which is perpendicular to the plane of the saw blade; a turntable locking mechanism for fixing the turntable to the base and releasing the turntable from the base; an inclination locking mechanism for fixing and releasing an inclination of the circular saw main unit; and an inclination stopping mechanism for maintaining an inclination of the circular saw main unit when the saw blade is positioned upright as the circular saw main unit inclines from one side to the other side, wherein a turntable locking operation handle for the turntable locking mechanism is disposed to a front side of the turntable, an inclination locking operation handle for the inclination locking mechanism is disposed to the front side of the turntable, and an inclination stopping operation handle for the inclination stopping mechanism is disposed to the front side of the turntable.

BEST MODE FOR CARRYING OUT THE INVENTION

Figure 1:
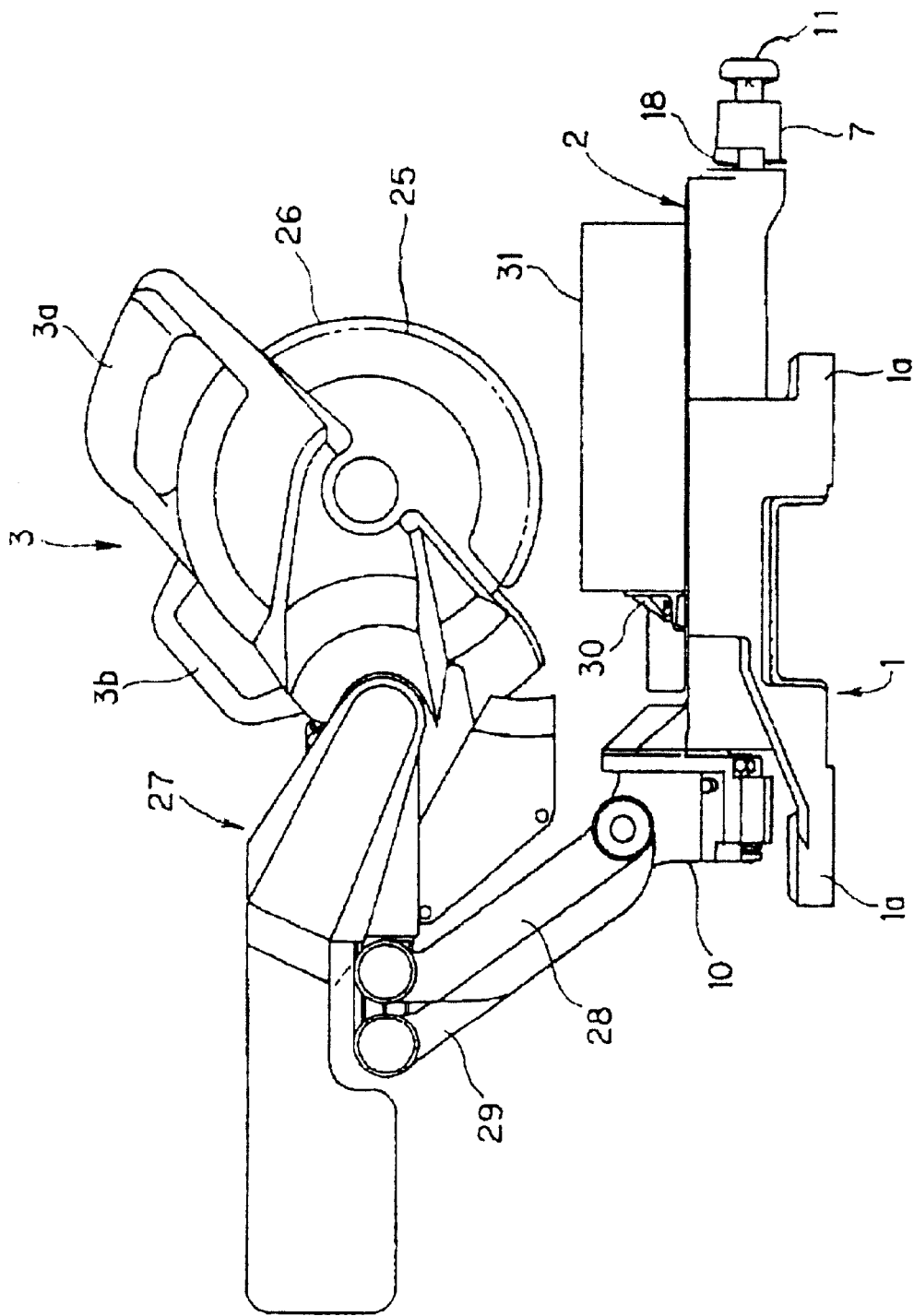
FIG. 1 is a front view of the table-top cutting machine according to the preferred embodiment of the present invention.

Hereinafter, a preferred embodiment of the present invention will be described with reference to FIGS. 1 through 12.

A table-top cutting machine according to a preferred embodiment of the present invention comprises a base 1, a turntable 2, a circular saw main unit 3, a turntable locking mechanism 4, an inclination locking mechanism 8 and an inclination stopping mechanism 16.

Figure 2:
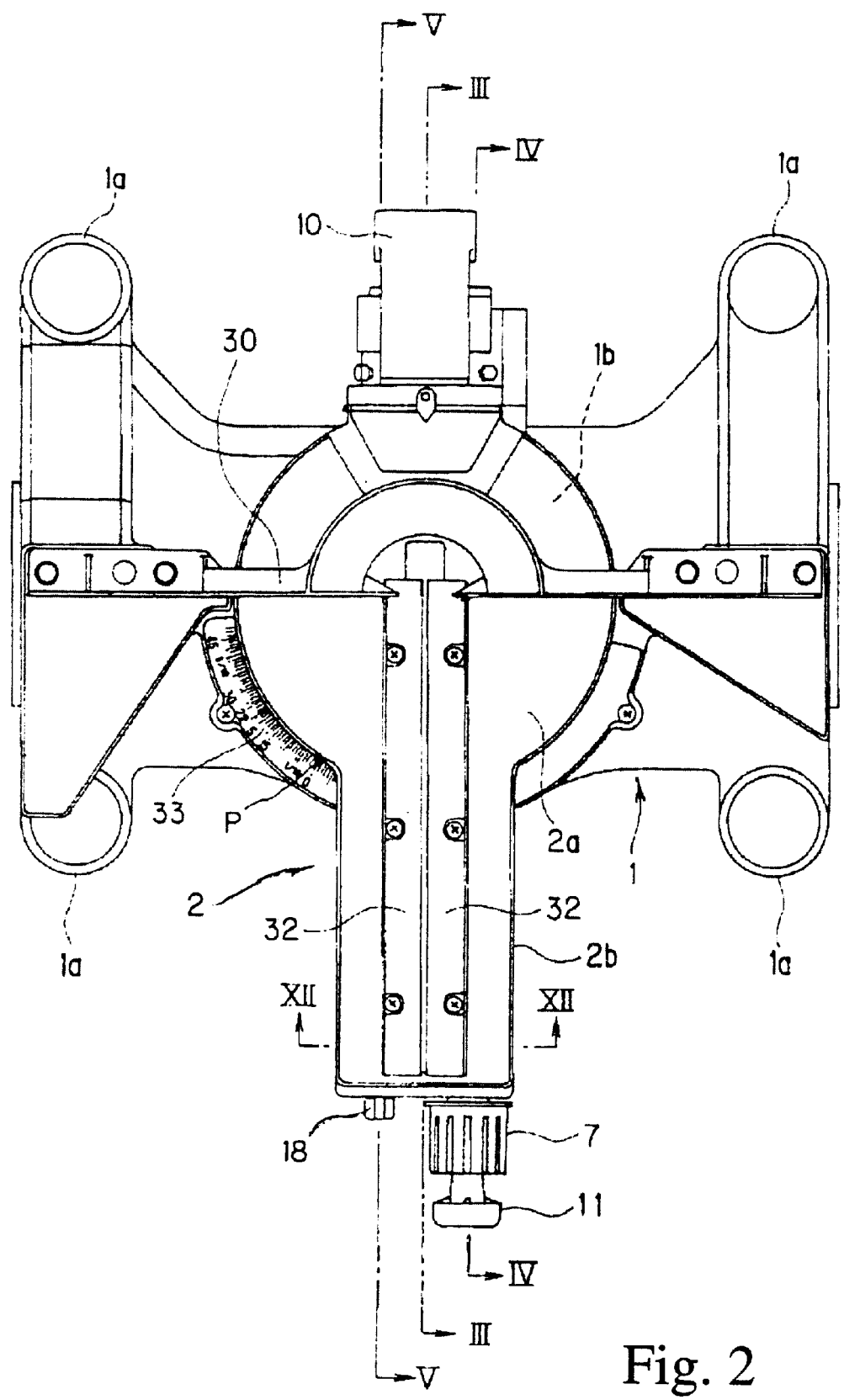
FIG. 2 is a plan view of the base and the turntable of the table-top cutting machine according to the present invention.

The base 1, as shown in FIG. 2, comprises four leg portions 1a and a circle shaped turntable mounting portion 1b which is located at the center of the leg portions 1a. A fence 30 is fixed to the base 1. A material-to-cut 31 such as a piece of lumber, is placed abutting the fence 30 and consequently positioned. An angle scale 33 for indicating an angle of the turntable 2 with respect to the base 1 is provided in a portion of the periphery of the turntable mounting portion 1b (See FIG. 2).

Figure 6:
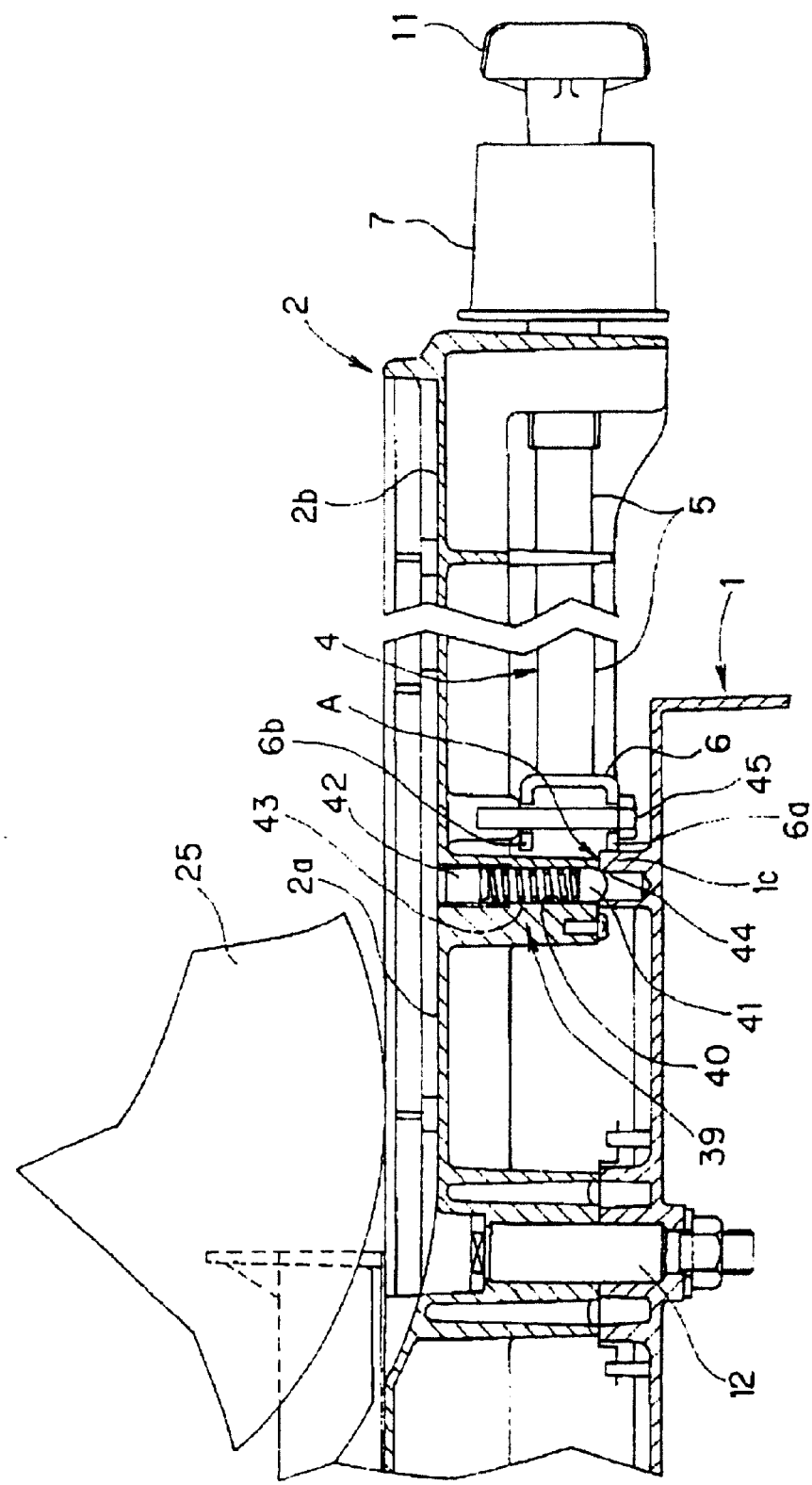
FIG. 6 is a partially enlarged cross-sectional view of the base and the turntable of the table-top cutting machine according to the present invention.

The turntable 2, as shown in FIG. 2, comprises a circular portion 2a which is mounted on the turntable mounting portion 1b of the base 1 and rotatably attached to the base 1 through a support axis 12 (See FIG. 3 and FIG. 6) which extends in vertical direction, and a rectangular portion 2b which is formed integrally with one end portion of the circular portion 2a. A bottom end of the circular portion 2a is in contact with the turntable mounting portion 1b of the base 1, thereby creating a ring-shaped contact-sliding portion A (FIG. 6). A pair of cutting edge plates 32 and 32 are disposed in parallel at a distance along the longitudinal direction of the rectangular portion 2b to a top surface of the turntable 2 which has such a structure, so that a front end of a saw blade 25 can be inserted between the cutting edge plates 32 and 32 when the material-to-cut 31 is cut.

Figure 3:
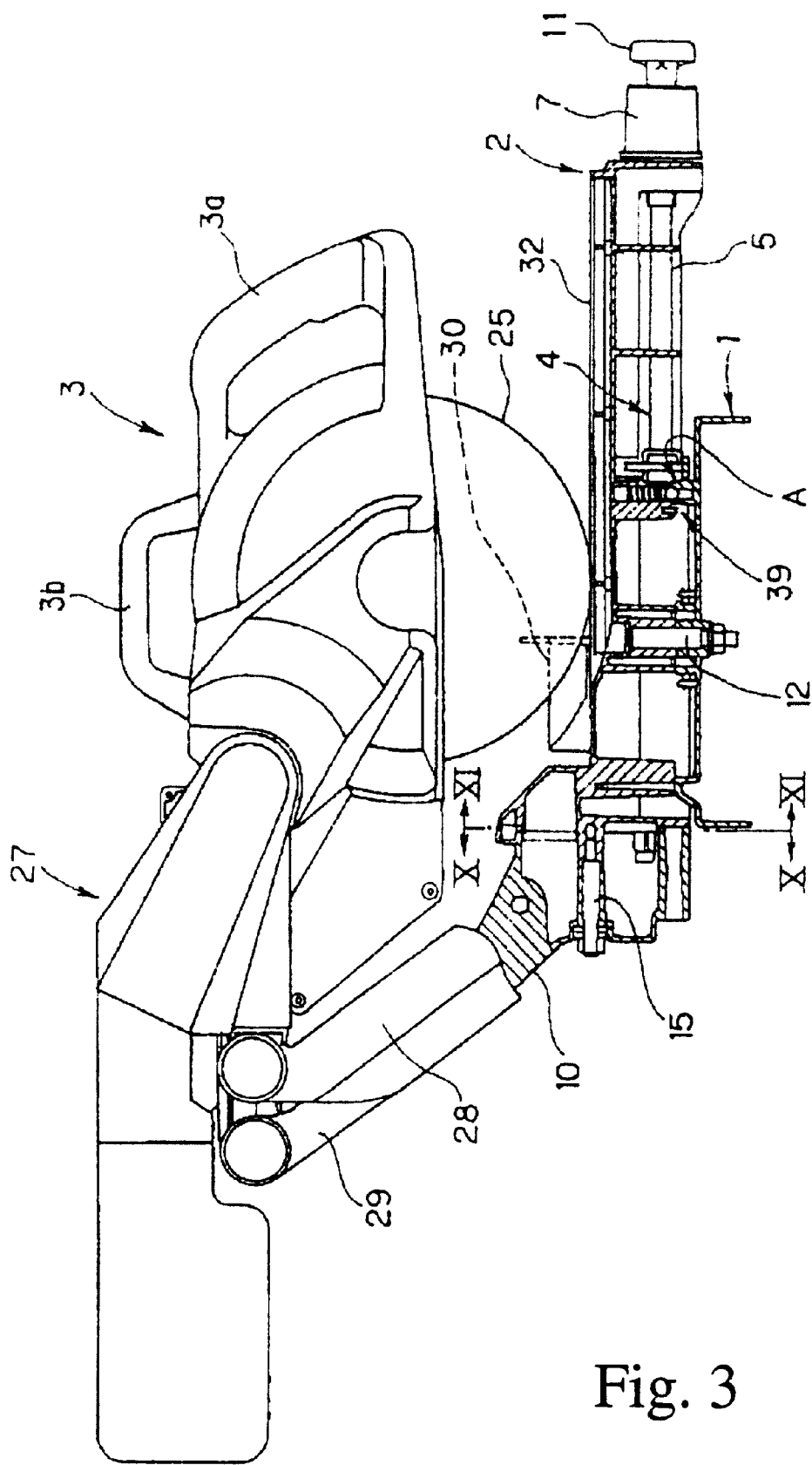
FIG. 3 is a cross-sectional view of FIG. 2 taken along a line III—III, showing the circular saw main unit attached.
Figure 10:
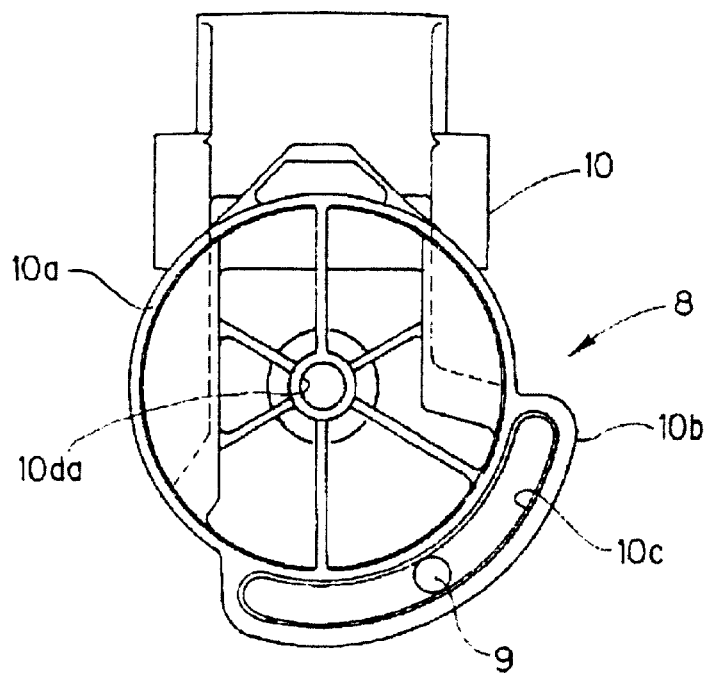
FIG. 10 is an end view of FIG. 3 taken along a line X—X.

In the circular portion 2a of the turntable 2, a bracket 10 is rotatably attached to a position on the opposite side to the rectangular portion 2b through a support axis 15 which extends in a horizontal direction (See FIG. 3). The bracket 10, as shown in FIG. 10, comprises at one end thereof a circular contact surface 10a which is at a right angle with respect to the support axis 15, and a through hole 10d for passing the support axis 15 is formed in a central portion of the contact surface 10a. Further, an extension portion 10b is formed integrally with a lower portion of an outer circumference of the contact surface 10a, and a arcuate slot 10c is formed in the extension portion 10b to extend in a circumferential direction of a circle which is defined about a central axial line of the support axis 15.

Figure 11:
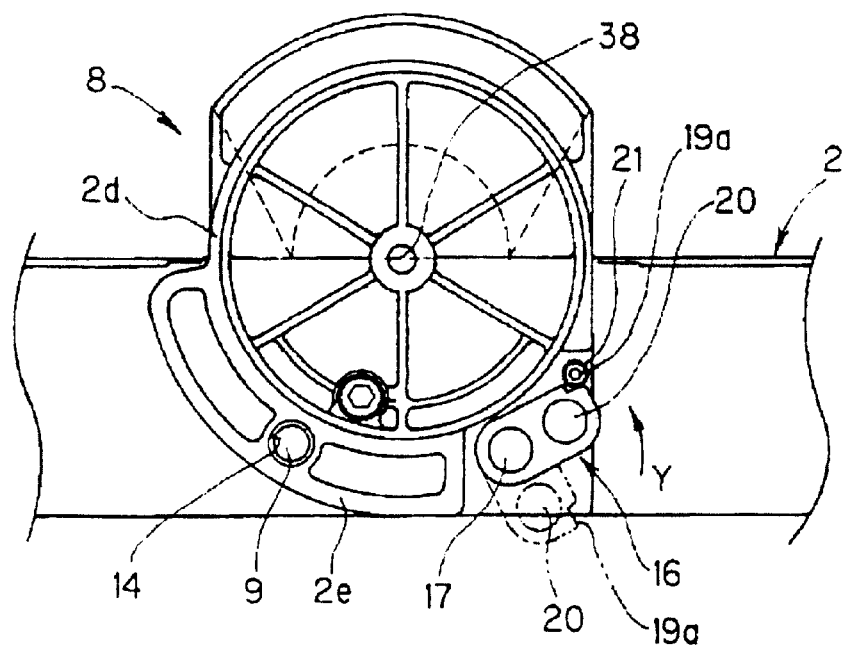
FIG. 11 is an end view of FIG. 3 taken along a line XI—XI.

On the other hand, in an area of the circular portion 2a of the turntable 2 where the bracket 10 is disposed, that is, at a position in the circular portion 2a on the opposite side to the rectangular portion 2b, a circular contact surface 2d is formed which matches with the circular contact surface 10a of the bracket 10 as shown in FIG. 11, and an extension portion 2c is formed integrally with a lower portion of an outer circumference of the contact surface 2d. In the extension portion 2c, a screw hole 14 is formed which accepts a front end portion of an inclination locking shaft 9 of an inclination locking mechanism 8 which will be described later.

The bracket 10 as described above is disposed such that the circular contact surface 10a contacts the circular contact surface 2d of the turntable 2. In such a condition, the support axis 15 is passed through the through hole 10d of the bracket 10 and a front end of the support axis 15 is engaged with a screw hole 38 which is formed in a central portion of the circular contact surface 2d of the turntable 2.

Figure 9:
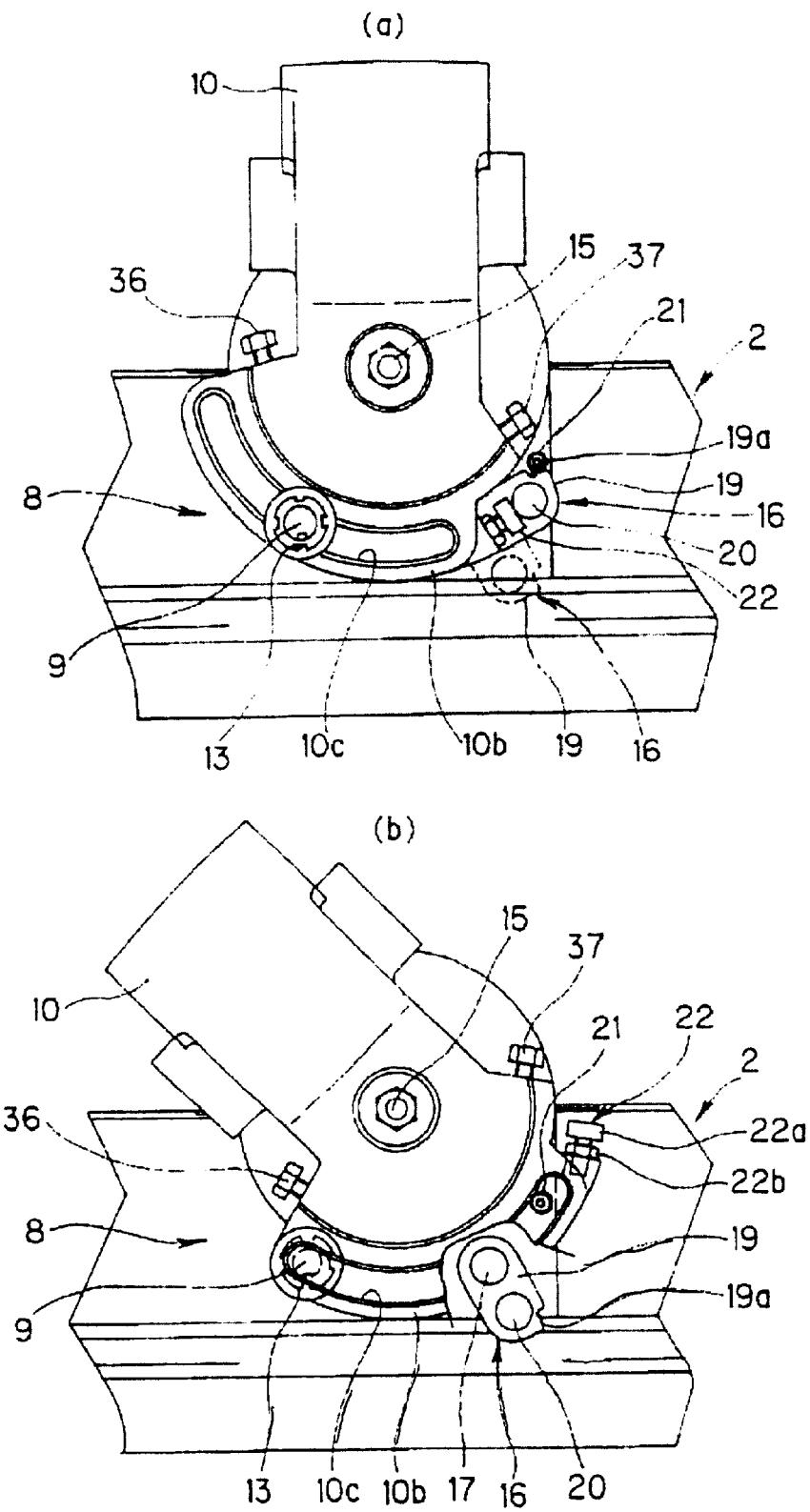
FIG. 9 is an explanatory diagram for describing the inclination locking mechanism of the table-top cutting machine according to the present invention.

While the bracket 10 is attached to the turntable 2 through the support axis 15 for free swinging movement in this manner, a pair of swinging restriction screws 36 and 37 are attached to the bracket 10 as shown in FIG. 9. The screws 36 and 37, abutting a stopper (not shown) which is disposed on the turntable 2 side, restrict the swinging range of the bracket 10 between the screws 36 and 37. Of course, the swinging limit position of the bracket 10 is fine-adjusted as engagement of the screws 36 and 37 are adjusted.

As described above, the circular saw main unit 3 is attached through a pair of links 28 and 29 to the bracket 10 which is attached to the turntable 2 for free swinging movement in such a manner that the circular saw main unit 3 can move in a left-to-right direction as shown in FIG. 1 and FIG. 3. In FIG. 1 and FIG. 3, denoted at 27 is a drive unit which houses a motor (not shown) for rotating the saw blade 25, a power transmission mechanism (not shown) for transmitting an output axis of the motor to the saw blade 25, etc., and denoted at 3a and 3b are a first and second handles which are disposed to the circular saw main unit 3.

As the base 1, the turntable 2 and the links 28 and 29 described above are combined with each other, the circular saw main unit 3 can rotate together with the turntable 2 along a horizontal surface about the support axis 12 (See FIG. 3) and rotate independently of the turntable 2 along a vertical surface about the support axis 15. Further, at an optional position within this rotating range, the circular saw main unit 3 can move along the same plane as the saw blade 25 within a predetermined stroke range which is allowed by the links 28 and 29. In other words, the circular saw main unit 3 is capable of moving along the plane of the saw blade 25 between a precutting position and a postcutting position and inclining along a plane which is perpendicular to the plane of the saw blade 25.

Hence, (1) as the saw blade 25 is moved in the direction of the plane of the saw blade 25 while being kept upright and with the material-to-cut 31 held such that the saw blade 25 which stands upright is at a right angle with respect to an abutting surface of the material-to-cut 31 with the fence 30, it is possible to cut the material-to-cut 31 at 90 degrees. (2) As the saw blade 25 is moved in the direction of the plane of the saw blade 25 while being kept upright and with the material-to cut 31 held such that the saw blade 25 standing upright is not at a right angle with respect to the abutting surface of the material-to-cut 31 with the fence 30, it is possible to cut the material-to-cut 31 at a slanted angle on the plane of the material-to-cut 31. (3) As the saw blade 25 is moved in the direction of the plane of the saw blade 25 while being kept inclined with respect to an upright line and with the material-to-cut 31 held such that the inclined saw blade 25 is at a right angle with respect to the abutting surface of the material-to-cut 31 with the fence 30, it is possible to cut the material-to-cut 31 at a slanted angle at a side surface of the material-to-cut 31. (4) Further, freely combining the positions of the saw blade 25 and the material-to-cut 31 described above, it is possible to cut the material-to cut 31 in accordance with a cutting pattern which is realized by each combination.

In the ring-shaped contact-sliding portion A between the base 1 and the turntable 2 described above, a positioning mechanism 39 is disposed (See FIG. 6).

The positioning mechanism 39 comprises a plunger bore 40, a plunger 41, an adjustment mechanism 42, an elastic member 43 and a plurality of recess portions 44.

More specifically, the plunger bore 40 penetrates the turntable 2 in a vertical direction to face the ring-shaped contact-sliding portion A at a position between the circular portion 2a and the rectangular portion 2b of the turntable 2. In an upper portion of the plunger bore 40, an internal thread portion for the adjustment mechanism 42 is formed as shown in FIG. 6.

The plunger 41 is formed by a pole-like plunger, and disposed within the plunger bore 40 in such a manner that the plunger 41 projects beyond and retracts into the plunger bore 40 at one end of the plunger bore 40 on the ring-shaped contact-sliding portion A.

The adjustment mechanism 42 is formed by a separable external thread which has a hexagonal hole at a top end, and is engaged with the internal thread portion which is formed in the upper portion of the plunger bore 40. Hence, when rotating, the adjustment mechanism 42 which has the structure of an external thread can move above and below within the internal thread.

The elastic member 43 is formed by a compressed coil spring. Disposed between the adjustment mechanism 42 and the plunger 41, the elastic member 43 urges the plunger 41 to below by a predetermined elastic force.

To accept the plunger 41 which is urged to below by the elastic member 43 as described above, the plurality of recess portions 44 are formed each facing the ring-shaped contact-sliding portion A in the base 1. Hence, distances between the center of the openings of the plurality of recess portions 44 and the center of the support axis 12 are equivalent to each other and also equal to a distance between the center of the plunger 41 described above and the center of the support axis 12. Of the plurality of recess portions 44, one portion at the center accepts the plunger 41 when the turntable 2 is located at a neutral position, whereas the other remaining recess portions 44 accept the plunger 41 when the turntable 2 rotates in a clockwise direction or a counterclockwise direction from the neutral position at one of a plurality of different angles. Of course, a predetermined value is set as an angle between a straight line connecting the center of the opening of the recess portion 44 which holds the turntable 2 at the neutral position and the center of the support axis 12 and a straight line connecting the center of the opening of each one of the other recess portions 44 and the center of the support axis 12, and a rotation angle of the turntable 2 is read by the angle scale 33 which is disposed to the base 1 based on a pointer P which is disposed to the turntable 2 (See FIG. 2).

Only top portions of the plurality of recess portions 44 are open and bottom portions of the plurality of recess portions 44 are closed. This prevents foreign articles from getting into the recess portions.

In the positioning mechanism 39 described above, when rotating, the adjustment mechanism 42 which has the structure of an external thread can move above and below within the internal thread of the plunger bore 40. Since this results in allowing to adjust an elastic force applied upon the plunger 41 by the elastic member 43 which is formed by a compressed coil spring, it is possible for an operator to set the elastic force to any desirable value.

Figure 4:
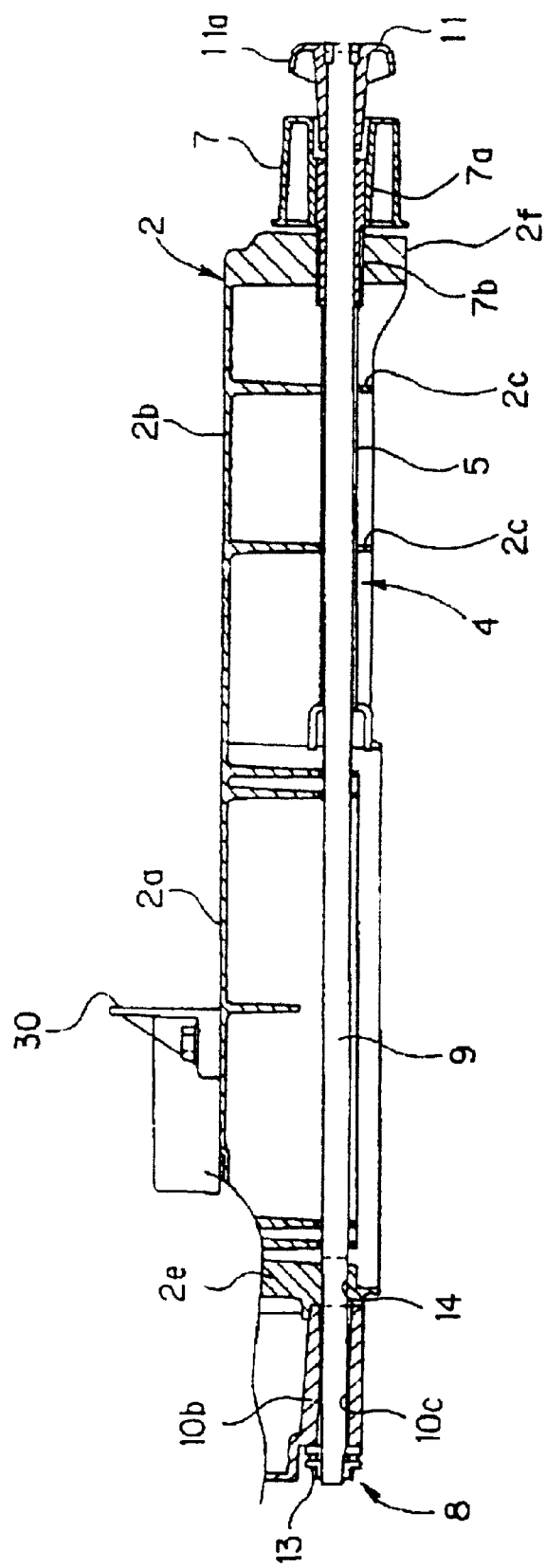
FIG. 4 is a cross-sectional view of FIG. 2 taken along a line IV—IV.
Figure 7:
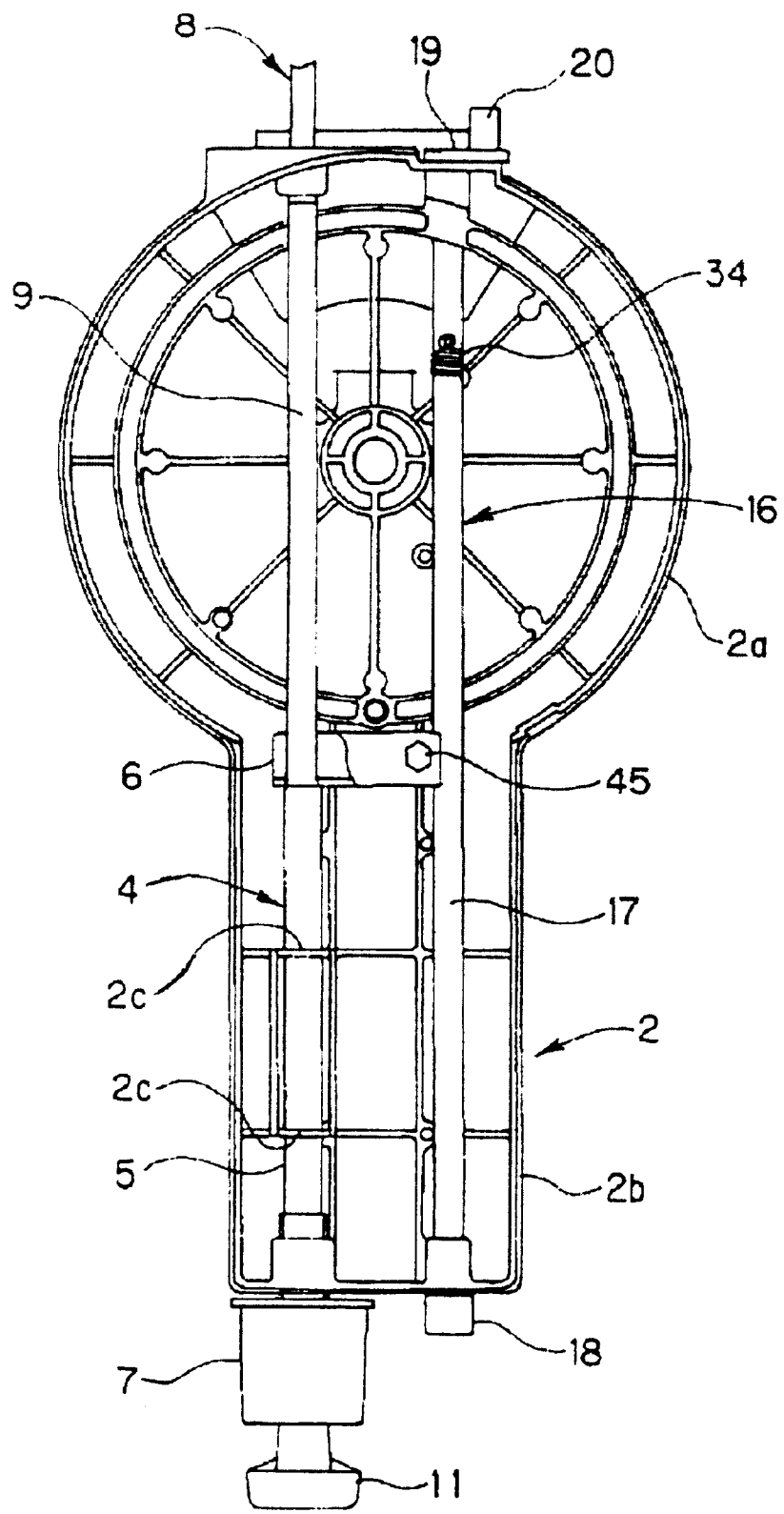
FIG. 7 is a bottom plan view of the turntable of the table-top cutting machine according to the present invention.
Figure 8:
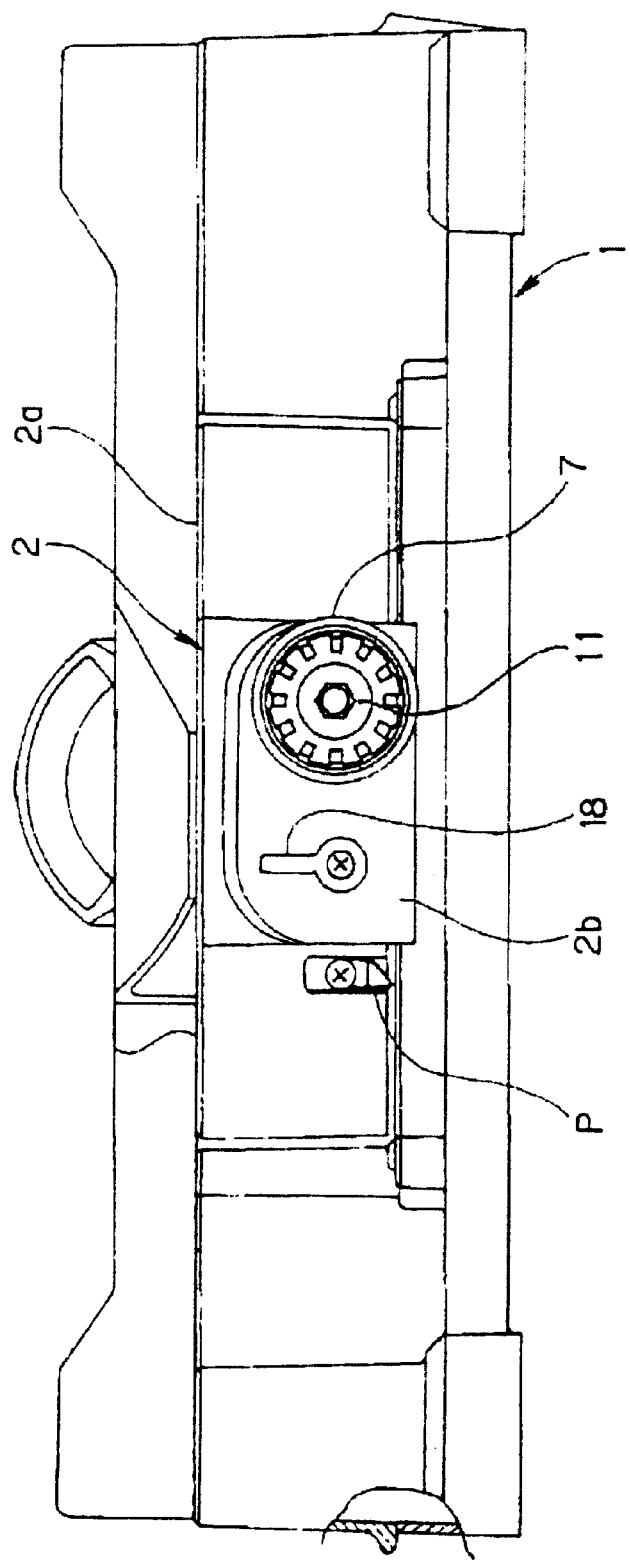
FIG. 8 is a right-hand side view of the table-top cutting machine according to the present invention.

The turntable locking mechanism 4, as clearly shown in FIG. 4, FIG. 6 and FIG. 7, is disposed for fixing the turntable 2 to the base 1 and releasing the turntable 2 from the base 1, and as such, comprises a turntable locking shaft 5, a locking lever 6 and a turntable locking operation handle 7.

The turntable locking shaft 5 is formed by a hollow shaft, and disposed, as it is deviated toward one side along the transverse direction of the rectangular portion 2b, within the rectangular portion 2b of the turntable 2 along the longitudinal direction of the rectangular portion 2b. The turntable locking shaft 5 is supported by a rib 2c of the turntable 2 so as to slide along the longitudinal direction of the turntable locking shaft 5.

The locking lever 6, as clearly shown in FIG. 6, is formed approximately in the shape of the letter U to comprise a pair of leg portions 6a and 6b. The locking lever 6 is disposed such that the leg portion 6a is positioned below and the leg portion 6b is positioned above, and attached at one end portion thereof to a back surface of the turntable 2 through a bolt 45 which extends in a vertical direction such that the locking lever 6 can slide along a horizontal surface. As clearly shown in FIG. 6 and FIG. 7, the other end of the locking lever 6 abuts a front end of the turntable locking shaft 5 described above. Hence, as the turntable locking shaft 5 moves to the back side of the table-top cutting machine along the axial direction of the turntable locking shaft 5, the locking lever 6 swings about the bolt 45 and a central portion of the leg portion 6a of the locking lever 6 presses a side wall of a rib 1c of the base I which forms the ring-shaped contact-sliding portion A.

Figure 14:
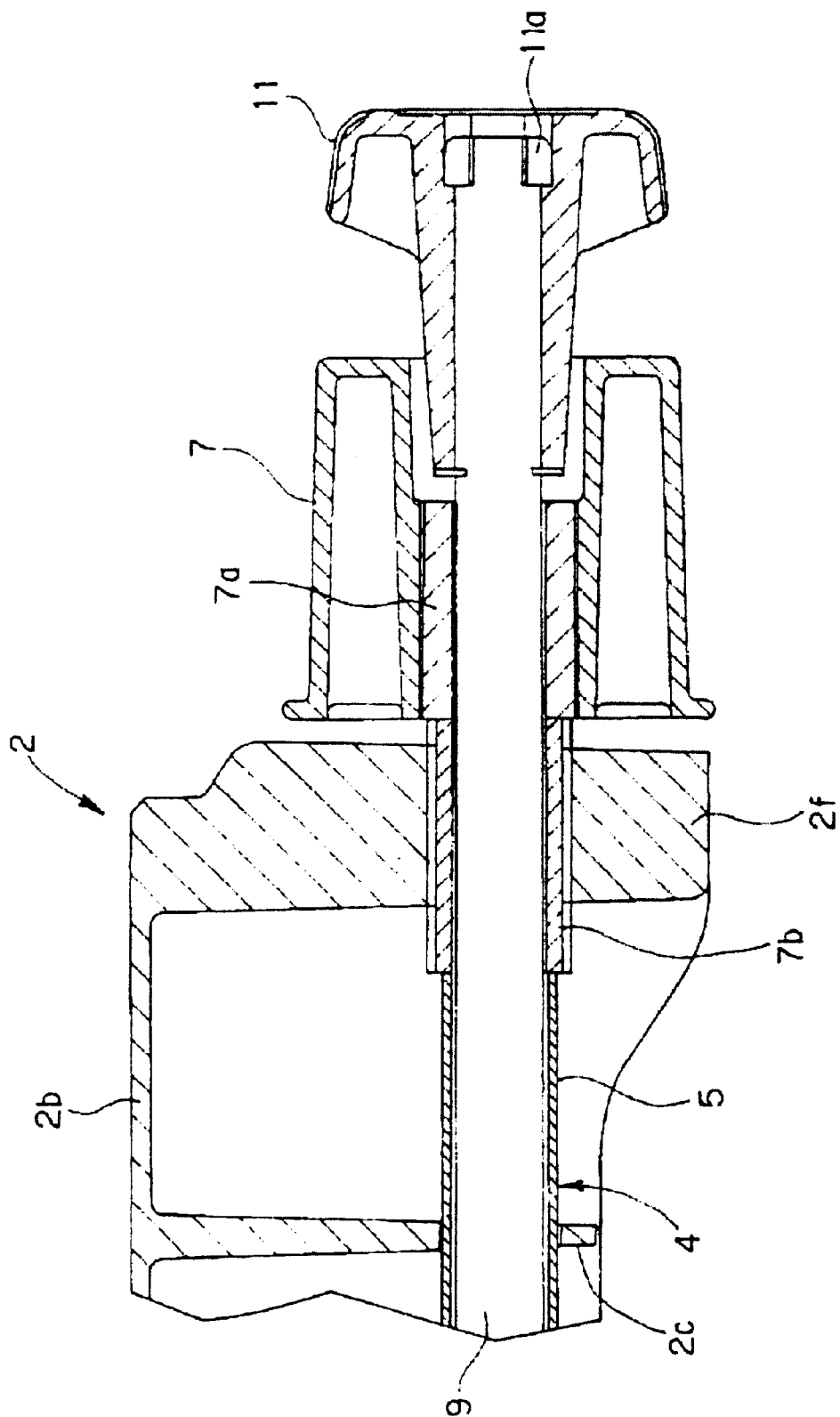
FIG. 14 is a cross-sectional view of a structure in which the turntable locking operation handle and the inclination locking operation handle are attached.

The turntable locking operation handle 7, as shown in FIG. 14, is formed as a hollow handle and disposed at a rear end of the turntable locking shaft 5 described above through a collar 7a and a threaded sleeve 7b which is formed integrally with the collar 7a. More particularly, the collar 7a is fit and fixed to an inner hole of the turntable locking operation handle 7. The threaded sleeve 7b which is formed integrally with the collar 7a is screwed to a side wall 2f of a front end portion of the turntable 2, and in this condition, a front end of the threaded sleeve 7b abuts the rear end of the turntable locking shaft 5. In this manner, the turntable locking operation handle 7 is disposed on the front side of the turntable 2.

Hence, as the turntable locking operation handle 7 is rotated and the threaded sleeve 7b is accordingly screwed in, the turntable locking shaft 5 moves to the back side of the table-top cutting machine, the locking lever 6 swings about the bolt 45 and the central portion of the leg portion 6a of the locking lever 6 presses the side wall of the rib 1c of the base 1, whereby the turntable 2 is fixed to the base 1.

The inclination locking mechanism 8, as clearly shown in FIG. 4 and FIG. 7, is disposed for fixing and releasing an inclination of the circular saw main unit 3, and comprises an inclination locking shaft 9 and an inclination locking operation handle 11.

The inclination locking shaft 9, as shown in FIG. 4, penetrates the turntable 2 along the longitudinal direction of the turntable 2, passing through the turntable locking shaft 5 described above. That is, the outer diameter of the inclination locking shaft 9 is slightly smaller than the inner diameter of the turntable locking shaft 5 and the length of the inclination locking shaft 9 is slightly longer than the total length of the turntable 2, and in addition, the inclination locking shaft 9 is formed by a shaft whose front end portion is threaded. The threaded front end portion of the inclination locking shaft 9 is screwed, passing through the turntable locking shaft 5, into the screw hole 14 which is formed in an extension portion 2e of the turntable 2 and allowed to project outside through the arcuate slot 10c which is formed in the extension portion 10b of the bracket 10, thereby the inclination locking shaft 9 is built on the turntable 2. A stopper ring 13 is attached to the front end of the inclination locking shaft 9 which projects from the arcuate slot 10c of the bracket 10.

On the other hand, the inclination locking operation handle 11 is fixed to a rear end of the inclination locking shaft 9 through a locking nut 11a. In this manner, the inclination locking operation handle 11 is disposed coaxially with the turntable locking operation handle 7 described above on the front side of the turntable 2.

Hence, as the inclination locking operation handle 11 is rotated in one direction, the extension portion 10b of the bracket 10 is pressed against the extension portion 2e of the turntable 2, whereby an inclination of the circular saw main unit 3 is fixed.

As described above, the turntable locking shaft 5 and the inclination locking shaft 9 are disposed coaxially with each other, and the mounting position of the hollow turntable locking shaft 5 is reliably held by the rib 2c of the turntable 2. Hence, if a shaft whose outer diameter is sufficiently smaller than the inner diameter of the turntable locking shaft 5 is used as the inclination locking shaft 9, it is possible to prevent dependably mutual contact of the turntable locking shaft 5 and the inclination locking shaft 9. Noting this, the rib 2c of the turntable 2 serves as a holding means which positions the turntable locking shaft 5 and the inclination locking shaft 9 coaxially at a distance from each other so that the turntable locking shaft 5 and the inclination locking shaft 9 will not contact each other.

Figure 5:
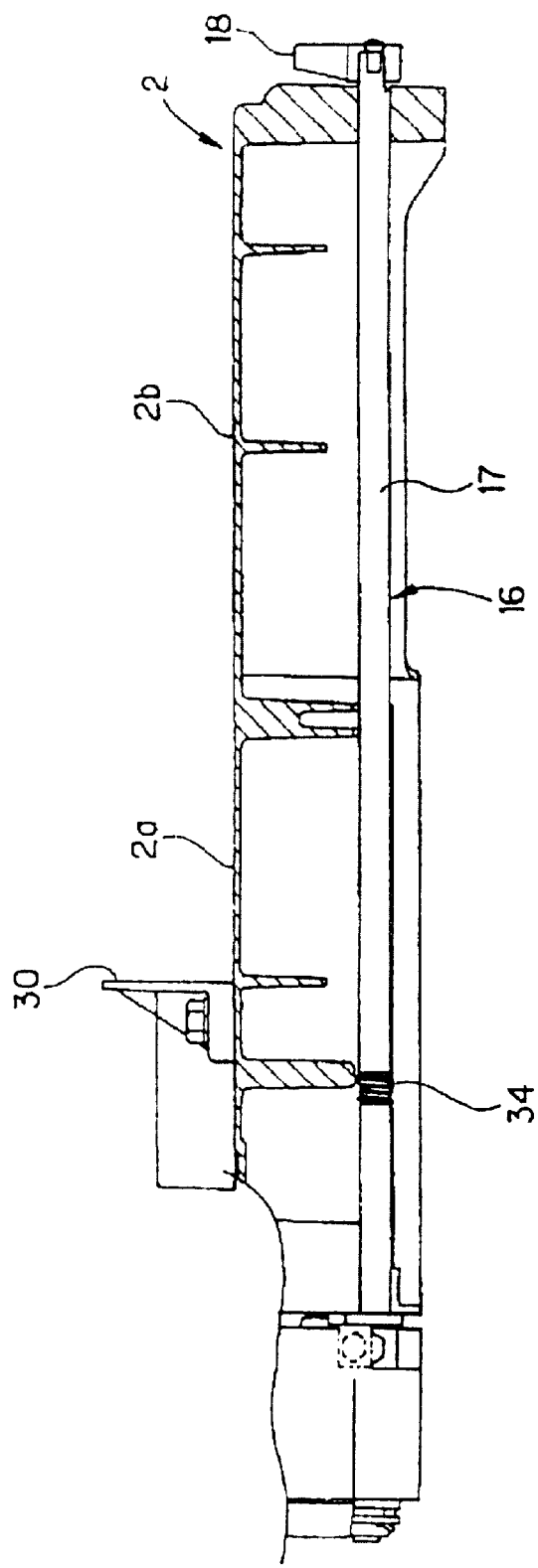
FIG. 5 is a cross-sectional view of FIG. 2 taken along a line V—V.

The inclination stopping mechanism 16, as clearly shown in FIG. 5, FIG. 7 and FIG. 9, is disposed for stopping an inclination of the circular saw main unit 3 when the saw blade 25 is positioned upright as the circular saw main unit 3 inclines from one side to the other side, and comprises an inclination stopping shaft 17, stopper means 22 and an inclination stopping operation handle 18.

The inclination stopping shaft 17 is slightly longer than the total length of the turntable 2, and as shown in FIG. 7, a front end portion of the inclination stopping shaft 17 is formed in the shape of a crank. In other words, a locking pin 20 which is deviated with respect to the inclination stopping shaft 17 is attached to the front end of the inclination stopping shaft 17 through a lever 19. The inclination stopping shaft 17 which has such a structure, as shown in FIG. 5 and FIG. 7, is disposed parallel to the inclination locking shaft 9 and supported by the turntable 2 to rotate freely about a central axial line of the inclination stopping shaft 17.

A rotating limit position of the inclination stopping shaft 17 in one direction is restricted as the inclination stopping shaft 17 abuts a projection 21 which is formed on the turntable 2. In short, a notched portion 19a is formed on the lever 19 of the inclination stopping shaft 17, and the projection 21 which is provided in the vicinity of the extension portion 2c of the turntable 2 abuts the notched portion 19a when the inclination stopping shaft 17 rotates and the locking pin 20 of the inclination stopping shaft 17 is consequently positioned on the circumference of a circle which limits the arcuate slot 10c which is formed in the bracket 10.

Further, a coil spring 34 for maintaining the projection 21 elastically abutting the notched portion 19a is attached to the inclination stopping shaft 17. That is, the coil spring 34 is disposed so as to cover the inclination stopping shaft 17 with one end of the coil spring 34 attached to the inclination stopping shaft 17 and the other end of the coil spring 34 attached to the turntable 2, so that the coil spring 34 urges the inclination stopping shaft 17 with an elastic force which rotates the inclination stopping shaft 17 in the direction of the arrow Y in FIG. 11.

The stopper means 22 is formed by a bolt 22a and a locking nut 22b, and attached to the bracket 10 described above in such a manner that the stopper means 22 abuts the locking pin 20 of the inclination stopping shaft 17 described above when the saw blade 25 is positioned upright as the circular saw main unit 3 inclines from one side to the other side (See FIG. 9(a)). Of course, it is possible to fine-adjust the position of the saw blade 25 by adjusting the engagement of the bolt 22a at the stopper means 22.

The inclination stopping operation handle 18 is attached to a rear end of the inclination stopping shaft 17 described above, and therefore, positioned on the front side of the turntable 2.

Hence, when the saw blade 25 is positioned upright as the circular saw main unit 3 inclines from one side to the other side, the inclination stopping mechanism prevents inclination of the circular saw main unit 3 and the saw blade 25 is kept upright. In this condition, as the inclination stopping operation handle 18 is rotated against the spring 34, stopping of the inclination of the circular saw main unit 3 is released and the inclination of the circular saw main unit 3 is allowed to incline further.

The support axis 12 is disposed at the center of the circular portion 2a of the turntable 2 in the table-top cutting machine according to the present invention. Hence, to avoid interference with the support axis 12, the table-top cutting machine has a basic structure in that the turntable locking shaft 5, the inclination locking shaft 9 and the inclination stopping shaft 17 are deviated within the rectangular portion 2b of the turntable 2 along the transverse direction of the rectangular portion 2b. Because of this, the turntable locking mechanism 4, the inclination locking mechanism 8 and the inclination stopping mechanism 16 each has a special structure as described above.

Now, a method of operating the table-top cutting machine according to the present invention will be described.

A description will be given of a first cutting pattern in which a material-to-cut 31 which is a rectangular parallelepiped section of lumber is cut with a rotating angle of the turntable 2 maintained at 0 degrees and a tilt angle of the saw blade 25 maintained at 0 degrees.

First, the inclination locking operation handle 11 which is disposed to the front side of the turntable 2 is fastened with a tilt angle of the saw blade 25 maintained at 0 degrees by the inclination locking mechanism 8, to thereby lock the circular saw main unit 3 to the turntable 2 through the links 28 and 29 and the bracket 10.

Next, the turntable locking operation handle 7 which is disposed to the front side of the turntable 2 is loosened to release fixing of the turntable 2 to the base 1, and in this condition, the turntable 2 is rotated so that the pointer P of the turntable 2 points at 0 degrees on the angle scale 33 of the base 1. Meanwhile, the plunger 41 of the positioning mechanism 39 is accepted by the recess portions 44 which are formed in the base 1 at the ring-shaped contact-sliding portion A. As the plunger 41 is accepted by the recess portions 44 in this manner, a clicking sound is created and a small impact force upon creation of the clicking sound is transmitted to an operator, so that the operator recognizes that the rotating angle of the turntable 2 with respect to the base 1 is 0 degrees by not only visually checking the angle scale 33 but also by his hearing the clicking sound and his tactile sense feeling the small impact force which is transmitted to him together with the clicking sound. The turntable locking operation handle 7 is fastened in such a condition, whereby the turntable 2 is locked to the base 1. With one surface of the material-to-cut 31 (hereinafter an "outer side surface") abutting the fence 30, the material-to-cut 31 is fixed on the base 1 by means of a fixing metal tool (not shown).

Following this, with the circular saw main unit 3 held at the top-most position, namely, the precutting position as shown in FIG. 1, the circular saw main unit 3 is moved to a forward side to the turntable 2, i.e., to the right-hand side in FIG. 1. In this condition, the motor (not shown) is driven to rotate the saw blade 25, thereby pressing the circular saw main unit 3 below. In association with the pressing of the circular saw main unit 3, the safety cover 26 covering an exposed portion around the saw blade 25 retracts into a casing of the circular saw main unit 3, a lower half portion of the saw blade 25 is exposed, and a forward side portion of the material to-cut 31 is consequently cut into. As the circular saw main unit 3 is pressed below and arrives at the bottom-most position, the bottom edge of the saw blade 25 sinks between the pair of cutting edge plates 32 and 32 which are disposed on the turntable 2.

In the condition as above, the circular saw main unit 3 is moved to the rear side to the turntable 2 while pressed below (See FIG. 3). As a result, the material to-cut 31 is cut straight in a vertical direction with respect to the outer side surface of the material-to-cut 31. In other words, the material-to-cut 31 is cut such that the material-to-cut 31 has a cut surface which is limited by a cutting line which is perpendicular to an upper side (hereinafter a "reference line") of the outer side surface in the plane of the material-to-cut 31 and a cutting line which is perpendicular to the reference line at the outer side surface.

Next, a description will be given on a second cutting pattern in which a material-to-cut 31 which is a rectangular parallelepiped section of lumber is cut with the rotating angle of the turntable 2 maintained at any desirable angle other than 0 degrees, e.g., 45 degrees and the tilt angle of the saw blade 25 maintained at 0 degrees.

Of course, in the second cutting pattern as well as in the first cutting pattern described above, the circular saw main unit 3 is locked to the turntable 2 through the links 28 and 29 and the bracket 10 with the tilt angle of the saw blade 25 at 0 degrees maintained by the inclination stopping mechanism 16.

First, the turntable locking operation handle 7 which is disposed to the front side of the turntable 2 is loosened to release fixing of the turntable 2 to the base 1, and in this condition, the turntable 2 is rotated so that the pointer P of the turntable 2 points at 45 degrees on the angle scale 33 of the base 1. Meanwhile, as in the first cutting pattern, the positioning mechanism 39 creates a clicking sound and an associated small impact force is transmitted to an operator. Hence, the operator recognizes that the turntable 2 is at the desired angle with respect to the base 1 by not only visually checking the angle scale 33 but also by his hearing the clicking sound and his tactile sense feeling the small impact force which is transmitted to him together with the clicking sound. In such a condition, the turntable locking operation handle 7 which is disposed to the front side of the turntable 2 is fastened to lock the turntable 2 to the base 1. As in the first cutting pattern described above, with one surface of the material-to-cut 31 abutting the fence 30, the material-to-cut 31 is fixed on the base 1 by means of a fixing metal tool (not shown).

Next, as in the first cutting pattern, with the circular saw main unit 3 held at the top-most position, namely, the precutting position as shown in FIG. 1, the circular saw main unit 3 is moved to the forward side to the turntable 2, i.e., to the right-hand side in FIG. 1. In this condition, the motor (not shown) is driven to rotate the saw blade 25, thereby pressing the circular saw main unit 3 below. As a result, the forward side portion of the material-to-cut 31 is cut into as in the first cutting pattern.

In the condition as above, the circular saw main unit 3 is moved to the rear side to the turntable 2 while being pressed below (See FIG. 3). As a result, the material-to-cut 31 is cut to have a cut surface which is limited by a cutting line which is inclined with respect to the reference line in the plane of the material-to cut 31 and a cutting line which is perpendicular to the reference line at the outer side surface of the material-to-cut 31.

Furthermore, a description will be given on a third cutting pattern in which a material-to-cut 31 which is a rectangular parallelepiped section of lumber is cut with the rotation angle of the turntable 2 maintained at 0 degrees and the tilt angle of the saw blade 25 maintained at any desirable angle, e.g., 45 degrees.

Of course, in the third cutting pattern as well as in the first cutting pattern described above, the turntable locking operation handle 7 which is disposed to the front side of the turntable 2 is fastened with the rotating angle of the turntable 2 with respect to the base 1 maintained at 0 degrees so that the turntable 2 is locked to the base 1.

First, the inclination locking operation handle 11 which is disposed to the front side of the turntable 2 is loosened and the circular saw main unit 3 is inclined to set the tilt angle of the saw blade 25 to 45 degrees. In this condition, the inclination locking operation handle 11 is fastened and the circular saw main unit 3 is consequently locked to the turntable 2 through the links 28 and 29 and the bracket 10.

While the circular saw main unit 3 is free to incline until the saw blade 25 is held upright which is needless to describe, as the saw blade 25 stands upright, the inclination stopping mechanism 16 holds the saw blade 25 standing upright. In other words, the tilt angle of the saw blade 25 is kept at 0 degrees. As this occurs, the inclination stopping operation handle 18 of the inclination stopping mechanism 16 is rotated to release the tilt angle of the saw blade 25 from 0 degrees and allows a further inclination. As in the first cutting pattern described above, with one surface of the material-to-cut 31 abutting the fence 30, the material-to-cut 31 is fixed on the base 1 by means of a fixing metal tool (not shown).

Following this, as in the first cutting pattern, with the circular saw main unit 3 held at the top-most position, namely, the precutting position as shown in FIG. 1, the circular saw main unit 3 is moved to the forward side to the turntable 2, i.e., to the right-hand side in FIG. 1. In this condition, the motor (not shown) is driven to rotate the saw blade 25, thereby pressing the circular saw main unit 3 below. As a result, the forward side portion of the material-to-cut 31 is cut into as in the first cutting pattern.

In the condition as above, the circular saw main unit 3 is moved to the rear side to the turntable 2 while being pressed below (See FIG. 3). As a result, the material-to-cut 31 is cut to have a cut surface which is limited by a cutting line which is perpendicular to the reference line on the plane of the material-to-cut 31 and a cutting line which is inclined with respect to the reference line at the outer side surface of the material-to-cut 31.

Furthermore, a description will be given of a fourth cutting pattern in which a material-to-cut 31 which is a rectangular parallelepiped section of lumber is cut with the rotating angle of the turntable 2 maintained at any desirable angle other than 0 degrees, e.g., 45 degrees, and the tilt angle of the saw blade 25 maintained at any desirable angle other than 0 degrees, e.g., 45 degrees.

First, as in the second cutting pattern, the turntable locking operation handle 7 is loosened to release fixing of the turntable 2 to the base 1, and in this condition, the turntable 2 is rotated so that the pointer P of the turntable 2 points at 45 degrees on the angle scale 33 of the base 1. With the turntable 2 as such, the turntable locking operation handle 7 is fastened to lock the turntable 2 to the base 1.

Next, as in the third cutting pattern, the inclination locking operation handle 11 is loosened and the circular saw main unit 3 is inclined to set the tilt angle of the saw blade 25 to 45 degrees. In this condition, the inclination locking operation handle 11 is fastened and the circular saw main unit 3 is consequently locked to the turntable 2 through the links 28 and 29 and the bracket 10. As in the first cutting pattern described above, with the outer side surface of the material-to-cut 31 abutting the fence 30, the material-to-cut 31 is fixed on the base 1 by means of a fixing metal tool (not shown).

Following this, as in the first cutting pattern, with the circular saw main unit 3 held at the top-most position, namely, the precutting position as shown in FIG. 1, the circular saw main unit 3 is moved to the forward side to the turntable 2, i.e., to the right-hand side in FIG. 1. In this condition, the motor (not shown) is driven to rotate the saw blade 25, thereby pressing the circular saw main unit 3 below. As a result, the forward side portion of the material-to-cut 31 is cut into as in the first cutting pattern.

In the condition as above, the circular saw main unit 3 is moved to the rear side to the turntable 2 while being pressed below (See FIG. 3). Thereby, the material-to-cut 31 is cut to have a cut surface which is limited by a cutting line which is inclined with respect to the reference line on the plane of the material-to cut 31 and a cutting line which is inclined with respect to the reference line at the outer side surface of the material-to-cut 31.

Figure 12:
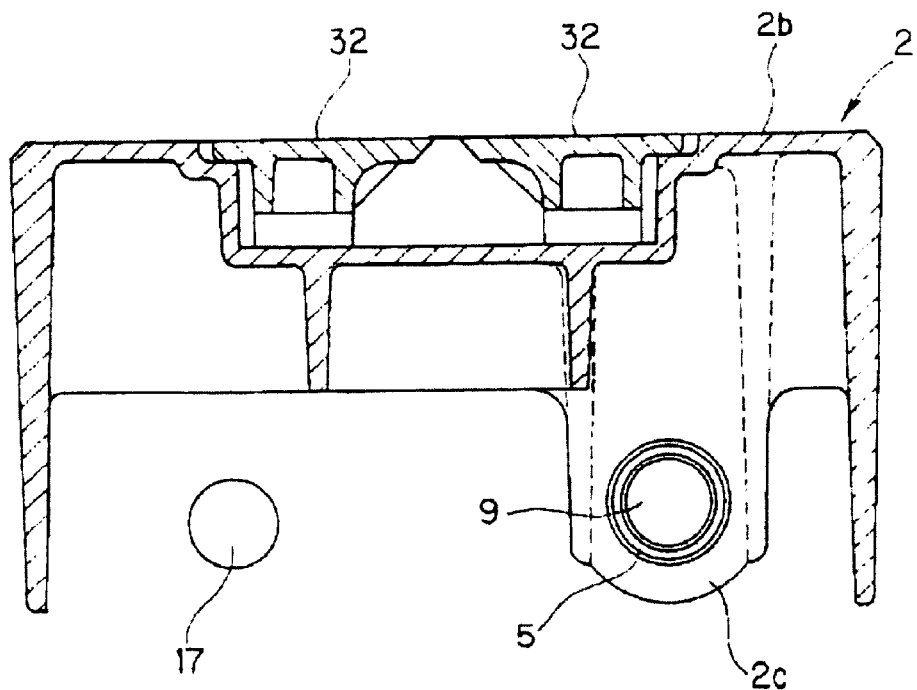
FIG. 12 is an end view of FIG. 2 taken along a line XII—XII.
Figure 13:
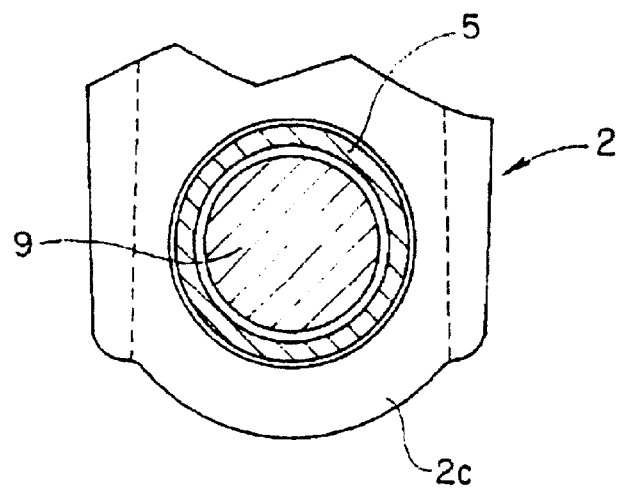
FIG. 13 is a partially enlarged cross-sectional view of a structure in which the turntable locking shaft and the inclination locking shaft are attached in FIG. 12.
Figure 15:
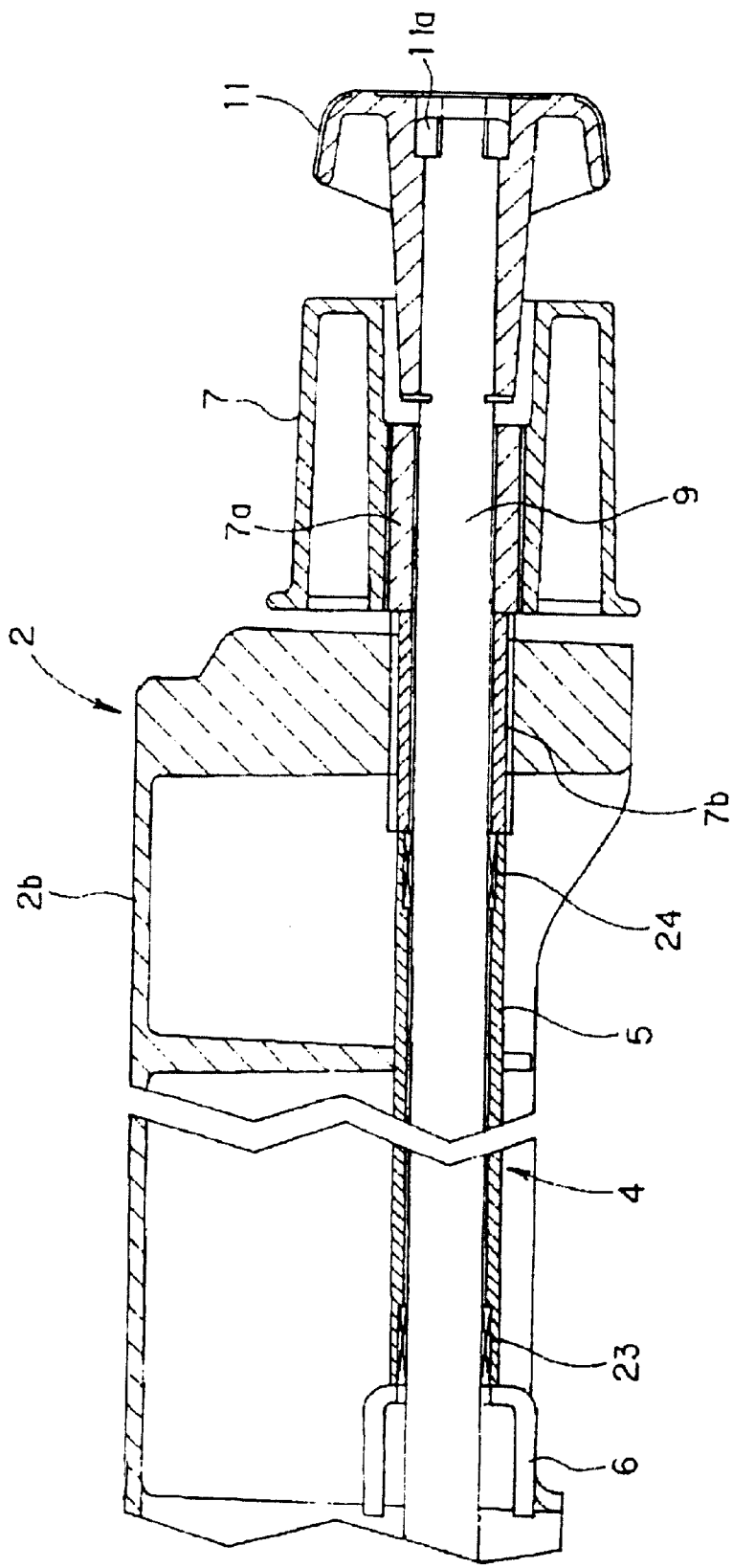
FIG. 15 is a cross-sectional view showing a modification of the holding means which holds a gap between the turntable locking shaft and the inclination locking shaft.
Figure 16:
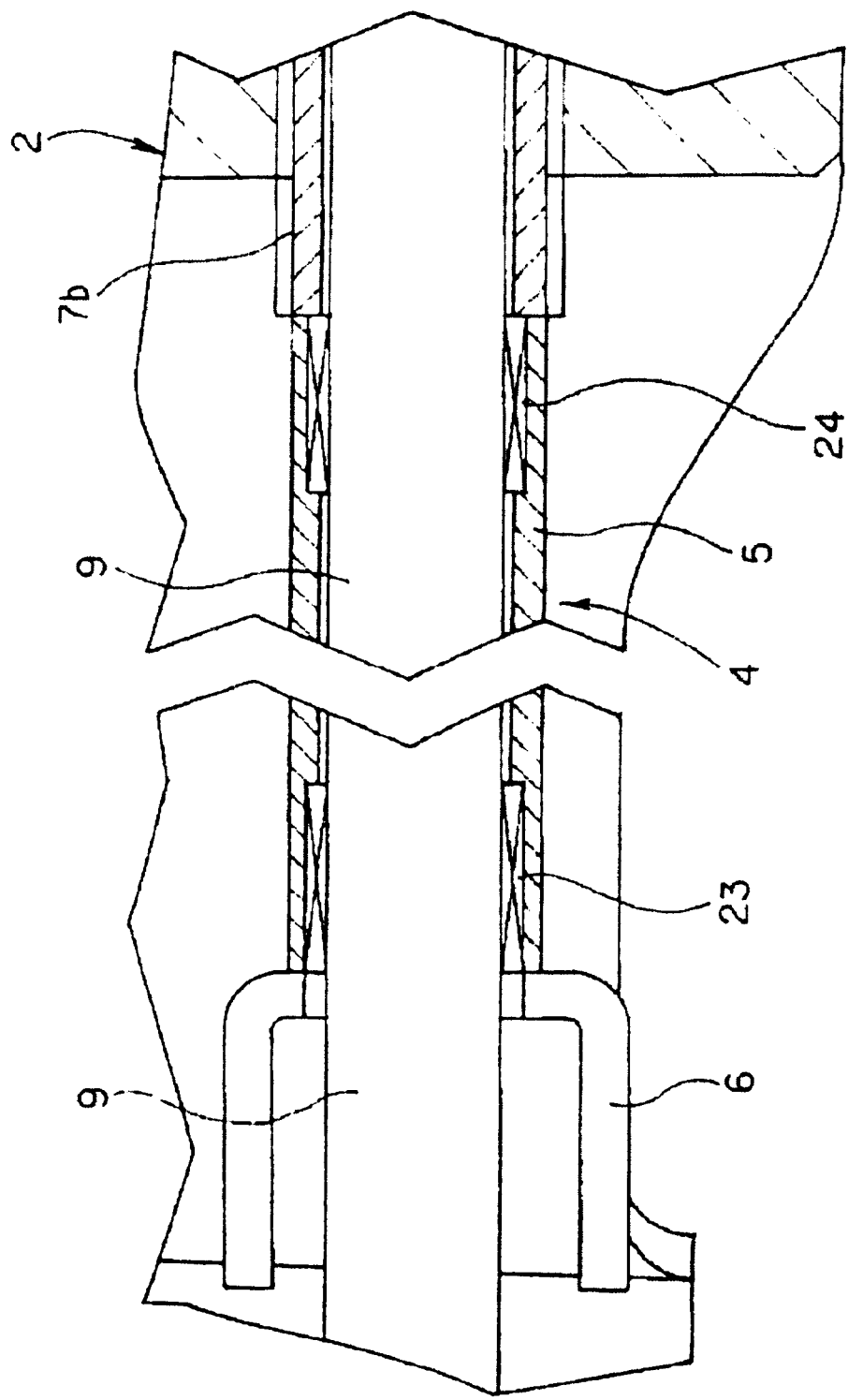
FIG. 16 is a partially enlarged cross-sectional view of FIG. 15.

The foregoing has described that in the table-top cutting machine according to the preferred embodiment of the present invention, the rib 2c of the turntable 2 serves as the holding means which positions the turntable locking shaft 5 and the inclination locking shaft 9 coaxially at a distance from each other so that the turntable locking shaft 5 and the inclination locking shaft 9 will not contact each other (See FIG. 12 and FIG. 13). However, as shown in FIG. 15 and FIG. 16, bearings 23 and 24 which serve as the holding means may be disposed between the turntable locking shaft 5 and the inclination locking shaft 9 so that the turntable locking shaft 5 and the inclination locking shaft 9 are positioned coaxially at a distance from each other so that the turntable locking shaft 5 and the inclination locking shaft 9 will not contact each other.

While the foregoing has also described that the table-top cutting machine according to the preferred embodiment of the present invention comprises the base 1, the turntable 2, the circular saw main unit 3, the turntable locking mechanism 4, the inclination locking mechanism 8 and the inclination stopping mechanism 16, that the turntable locking operation handle 7 and the inclination locking operation handle 11 are disposed to the front side of the turntable 2, and that the turntable locking shaft 5 and the inclination locking shaft 9 are positioned coaxially with each other, the table-top cutting machine according to the present invention may be modified in the following manners:

(1) First Modification

The inclination stopping mechanism 16 is omitted in the table-top cutting machine according to the preferred embodiment of the present invention described above.

(2) Second Modification

The turntable locking shaft 5 and the inclination locking shaft 9 are positioned separately from each other instead of coaxially with each other in the table-top cutting machine according to the preferred embodiment of the present invention described above.

(3) Third Modification

The turntable locking shaft 5 and the inclination locking shaft 9 are positioned separately from each other instead of coaxially with each other in the first modification.

(4) Fourth Modification

The table-top cutting machine comprises the base 1, the circular saw main unit 3 which is attached to the base 1 to move between the precutting position and the postcutting position along the plane of the saw blade 25 and incline along the plane which is perpendicular to the plane of the saw blade 25, and the inclination locking mechanism 8 for fixing and releasing an inclination of the circular saw main unit 3, but omits the turntable 2 and the turntable locking mechanism 4. In this case, the inclination locking operation handle 11 is disposed to the front side of the base 1.

(5) Fifth Modification

The inclination stopping mechanism 16 is added to the fourth modification.

Further, although the table-top cutting machine according to the preferred embodiment of the present invention described above requires that the circular saw main unit 3 is movable within the predetermined stroke range which is allowed by the links 28 and 29, means for horizontally moving the circular saw main unit 3 may be used instead of the links 28 and 29. In addition, where it is not necessary that the circular saw main unit 3 is movable within a predetermined stroke range, the circular saw main unit 3 may be attached directly to the bracket 10 for free rotating movement without using the links 28 and 29.

As described above, the table-top cutting machine according to the first aspect of the present invention comprises the base; the circular saw main unit which is attached to the base to move between the precutting position and the postcutting position along the plane of the saw blade and incline along the plane which is perpendicular to the plane of the saw blade; and the inclination locking mechanism for fixing and releasing an inclination of the circular saw main unit, and the inclination locking operation handle for the inclination locking mechanism is disposed to the front side of the base. Hence, it is not necessary for an operator to move to the rear side of a table-top cutting machine to manipulate the inclination locking mechanism. It is possible for the operator to stay at the front side of a table-top cutting machine and manipulate the inclination locking mechanism extremely easily and dependably at the front side to the base without stretching his arm behind the base.

The table-top cutting machine according to the second aspect of the present invention comprises the base; the turntable which is rotatably attached to the base; the circular saw main unit which is attached to the turntable to move between the precutting position and the postcutting position along the plane of the saw blade and incline along the plane which is perpendicular to the plane of the saw blade; the turntable locking mechanism for fixing the turntable to the base and releasing the turntable from the base; and the inclination locking mechanism for fixing and releasing an inclination of the circular saw main unit, the turntable locking operation handle for the turntable locking mechanism is disposed to the front side of the turntable, and the inclination locking operation handle for the inclination locking mechanism is disposed to the front side of the turntable. Hence, it is possible to manipulate the turntable locking mechanism at the front side to the base. Furthermore, it is not necessary for an operator to move to the rear side of a tabletop cutting machine, and is possible for the operator to stay at the front side of the table-top cutting machine and manipulate the inclination locking mechanism extremely easily and dependably at the front side of the base without stretching his arm behind the base. This allows to manipulate both the turntable locking mechanism and the inclination locking mechanism efficiently.

According to the third aspect of the present invention, in the table-top cutting machine of the second aspect, the turntable locking shaft for the turntable locking mechanism and the inclination locking shaft for the inclination locking mechanism are disposed coaxially at a distance from each other through the holding means in such a manner that the turntable locking shaft and the inclination locking shaft do not contact each other, and the turntable locking operation handle is attached to one end of the turntable locking shaft while the inclination locking operation handle is attached to one end of the inclination locking shaft. Hence, it is possible to make effective use of mounting spaces for the turntable locking shaft and the inclination locking shaft, prevent interference between the turntable locking shaft and the inclination locking shaft, and smoothly and dependably manipulate both the turntable locking mechanism and the inclination locking mechanism.

The table-top cutting machine according to the fourth aspect of the present invention comprises the base; the circular saw main unit which is attached to the base to move between the precutting position and the postcutting position along the plane of the saw blade and incline along the plane which is perpendicular to the plane of the saw blade; the inclination locking mechanism for fixing and releasing an inclination of the circular saw main unit; and the inclination stopping mechanism for stopping an inclination of the circular saw main unit when the saw blade is positioned upright as the circular saw main unit inclines from one side to the other side, and the inclination stopping operation handle for the inclination stopping mechanism is disposed to the front side of the base. Hence, it is not necessary for an operator to move to the rear side of the table-top cutting machine to manipulate the inclination stopping mechanism. It is possible for the operator to stay at the front side of the table-top cutting machine and manipulate the inclination stopping mechanism extremely easily and dependable at the front side of the base without stretching his arm behind the base.

Furthermore, the table-top cutting machine according to the fifth aspect of the present invention comprises the base; the turntable which is rotatably attached to the base; the circular saw main unit which is attached to the turntable to move between the precutting position and the postcutting position along the plane of the saw blade and incline along the plane which is perpendicular to the plane of the saw blade; the turntable locking mechanism for fixing the turntable to the base and releasing the turntable from the base; the inclination locking mechanism for fixing and releasing an inclination of the circular saw main unit; and the inclination stopping mechanism for stopping an inclination of the circular saw main unit when the saw blade is positioned upright as the circular saw main unit inclines from one side to the other side, and the turntable locking operation handle for the turntable locking mechanism is disposed to the front side of the turntable, the inclination locking operation handle for the inclination locking mechanism is disposed to the front side of the turntable, and the inclination stopping operation handle for the inclination stopping mechanism is disposed on the front side of the turntable. Hence, it is possible to make effective use of mounting spaces for the turntable locking shaft and the inclination locking shaft, prevent interference between the turntable locking shaft and the inclination locking shaft, and smoothly and dependably manipulate both the turntable locking mechanism and the inclination locking mechanism. Further, it is not necessary for an operator to move to the rear side of the table-top cutting machine to manipulate the inclination stopping mechanism, but rather, it is possible for the operator to stay at the front side of the table-top cutting machine and manipulate the inclination stopping mechanism extremely easily and dependably at the front side of the turntable without stretching his arm behind the base.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A table-top cutting machine, comprising:

a base having a front and an oppositely disposed rear;

a circular saw main unit supported by the base and including a saw blade mounted thereon with a drive unit that rotates the saw blade about an rotation axis, the saw blade having an initial horizontal rotation axis and a planar surface that defines an initial vertical plane, the circular saw main unit being movable along the plane of the saw blade position and also being pivotable to incline the saw blade relative to horizontal;

an inclination locking mechanism for at least temporarily maintaining a selected inclination of the saw blade, the inclination locking mechanism having an inclination locking operating handle disposed proximate the front of the base;

an inclination locking shaft having an axis of rotation and connecting the inclination locking operating handle to the inclination locking mechanism, an inclination stopping mechanism for maintaining the saw blade in a vertical plane, the inclination stopping mechanism having an inclination stopping operating handle disposed proximate the front of the base;

an inclination stopping shaft having an axis of rotation and connecting the inclination stopping operating handle to the inclination stopping mechanism;

a turntable having a front and an oppositely disposed rear, being disposed between the base and the circular saw main unit, and being rotatably supported by the base about a vertical turntable rotation axis, the circular saw main unit being supported by the turntable and being revolvable therewith, a turntable locking mechanism for at least temporarily maintaining a selected rotational position of the turntable, the turntable locking mechanism having a turntable locking operating handle disposed proximate the front of the turntable and the inclination locking operating handle;

a turntable locking shaft connecting the turntable locking operating handle to the turntable locking mechanism;

a bracket rotatably connected to the rear of the turntable with a support pin having a central axis that extends parallel to and is spaced from the inclination locking shaft, the bracket having at one end thereof a planar and circular contact surface that is perpendicular to the central axis of the support pin and rotatable thereabout relative to a corresponding contact surface on the rear of the turntable, the bracket having an arcuate slot through an arc of which is centered on the central axis of the support pin, the rear of the turntable having an internally threaded aperture extending therethrough to engageably receive an externally threaded portion of the inclination locking shaft so that a rotation of the inclination locking operating handle moves the inclination locking shaft in a direction along its axis of rotation, the inclination locking shaft further extending through the arcuate slot in the bracket;

a stopper ring attached to an end of the inclination locking shaft that extends through the arcuate slot, the stopper ring having a larger diameter than a radical thickness of the arcuate slot so that, when the threaded inclination locking shaft is rotated in one direction, the stopper ring pulls the contact surface of the bracket against the corresponding contact surface on the rear of the turntable, thereby preventing the bracket from being rotated about the central axis of the support pin; and first and second links pivotally connected at one of each of their ends to the bracket at the same pivotal point and at the other of each of their ends to the circular saw main unit at separate pivot points to provide support for the circular saw main unit while allowing the latter to be moved in a generally horizontal direction in the plane of the saw blade, the circular saw main unit being revolvable about the central axis of the support pin when the inclination locking shaft is rotated by turning the inclination locking operating handle at the front of the turntable so that the stopper ring is not pulling the contact surface of the bracket against the corresponding contact surface on the rear of the turntable.

2. The table-top cutting machine as defined by claim 1, wherein:

the turntable locking shaft is coaxially disposed relative to a portion of the inclination locking shaft, the former being disposed outside a portion of the latter; and the turntable locking operating handle is coaxially disposed relative to the inclination locking operating handle, a portion of the former being disposed outside a portion of the latter.

3. The table-top cutting machine as defined by claim 1, further including:

a bearing disposed within one end of the turntable locking shaft and about the inclination locking shaft; and another bearing disposed within the other end of the turntable shaft and about the inclination locking shaft, the bearing and the another bearing maintaining a clearance between the turntable locking shaft and the inclination locking shaft.

4. The table-top cutting machine as defined by claim 2, further including:

a collar joined to and extending from the inclination locking operating handle;

an externally threaded sleeve connected to and coaxially extending from the collar in a direction away from the inclination locking operating handle, the collar and the sleeve being rotatable with the inclination locking operating handle about the inclination locking shaft, the front of the turntable having an internally threaded aperture extending therethrough to engageably receive the externally threaded sleeve so that a rotation of the inclination locking operating handle moves the inclination locking shaft in a direction along its axis of rotation; and an elongate locking lever pivotally mounted proximate one end thereof to the turntable, the inclination locking shaft passing centrally through locking lever without making contact therewith, another end of the locking lever abutting an end of the turntable locking shaft that is distal from the turntable locking operating handle, movement of the inclination locking shaft pivoting the locking lever against a portion of the base, thereby preventing the turntable from rotating relative to the base, the turntable being rotatable about the turntable rotation axis when the turntable locking shaft is rotated by turning the turntable locking operating handle at the front of the turntable so that the locking lever is not being held against the base.

5. The table-top cutting machine as defined by claim 4, further including:

a bolt threaded into the bracket;

a locking nut threaded onto the bolt to maintain the bolt at a selected position relative to the bracket, the inclination stopping shaft extending from the inclination stopping operating handle, through an aperture in the front of the turntable, parallel to but spaced from the inclination locking shaft, and through another aperture in the rear of the turntable; and an elongate lever affixed to the end of the inclination stopping shaft proximate the rear of the turntable, the lever having a locking pin affixed thereto and extending beyond and parallel to the inclination stopping shaft so that the locking pin revolves about the rotation axis of the inclination stopping shaft when the latter is rotated, the locking pin being disposed to block movement of the bolt, and therefore of the bracket, when the saw blade is vertically positioned and the inclination stopping shaft is rotated to a maximum position in one direction, the bracket being free to rotate when the inclination stopping shaft is rotated in an opposite direction by turning the inclination stopping operating handle at the front of the turntable so that the locking pin is not preventing movement of the bolt.

6. The table-top cutting machine as defined by claim 5, further including:

a projection extending from the rear of the turntable, the elongate lever having a notched portion into which the projection fits when the locking pin is positioned to block movement of the bolt; and a coil spring encircling a portion of the inclination stopping shaft and being connected between the inclination stopping shaft and the turntable to resiliently bias the lever against the projection.

* * * * *

UNITED STATES PATENT AND TRADEMARK OFFICE
CERTIFICATE OF CORRECTION

| | | |
|---|---|---|
| PATENT NO. | : 6,532,853 B1 | |
| APPLICATION NO. | : 09/515903 | |
| DATED | : March 18, 2003 | |
| INVENTOR(S) | : Kazuhiro Kakimoto et al. | |

It is certified that error appears in the above-identified patent and that said Letters Patent is hereby corrected as shown below:

In the Claims:

Column 16, Line 1, Claim 1: delete "centered on" and insert --located at a distance from--

Column 16, Line 13, Claim 1: delete "radical" and insert --radial--.

Column 16, Line 44, Claim 3: delete "1" and insert --2--.

The following claims should be added:

7. A compound miter saw, comprising:
a base having a front near which the user is positioned when the compound miter saw is in use and an oppositely disposed rear;
a circular saw main unit supported by the base and including a saw blade rotatably mounted thereon, the saw blade having an initial horizontal rotation axis and a planar surface that defines an initial vertical cutting plane perpendicular to its rotation axis, the circular saw main unit being pivotably attached adjacent to the rear of the base about an axis parallel to the saw blade rotation axis such that the circular saw main unit is movable by a user along the plane of the saw blade between a raised precutting position and a lowered postcutting position, the main circular saw unit also being pivotable relative to the base to incline the cutting plane of the saw blade relative to horizontal to make an inclined cut in a workpiece;
an inclination locking mechanism cooperating with the circular saw main unit and the base for temporarily maintaining a selected inclination of the cutting plane of the saw blade, the inclination locking mechanism having an inclination locking operating handle disposed proximate the front of the base and easily accessible by the user so that the user does not have to reach around the saw blade to adjust the inclination angle of the cutting plane;
a turntable having a front and an oppositely disposed rear, being disposed between the base and the circular saw main unit, and being rotatably supported by the base about a vertical turntable rotation axis, the circular saw main unit being supported by the turntable and being revolvable therewith as the turntable is rotated, the turntable having a circular portion and an elongate portion extending therefrom and past the front of the base; and
a turntable locking mechanism for at least temporarily maintaining a selected rotational position of the turntable, the turntable locking mechanism having a turntable locking operating handle disposed proximate the front of the turntable and the inclination locking operating handle.

UNITED STATES PATENT AND TRADEMARK OFFICE
CERTIFICATE OF CORRECTION

PATENT NO. : 6,532,853 B1
APPLICATION NO. : 09/515903
DATED : March 18, 2003
INVENTOR(S) : Kazuhiro Kakimoto et al.

It is certified that error appears in the above-identified patent and that said Letters Patent is hereby corrected as shown below:

The following claims should be added: (cont'd)

8. The table-top cutting machine as defined by claim 7 further including a turntable locking shaft connecting the turntable locking operating handle to the turntable locking mechanism.

9. The compound miter saw as defined by claim 7, further including an inclination locking shaft having an axis of rotation and connecting the inclination locking operating handle to the inclination locking mechanism.

10. The compound miter saw as defined by claim 9, wherein the circular saw main unit further includes a drive unit that rotates the saw blade about its rotation axis.

11. The compound miter saw as defined by claim 10, further including an inclination stopping mechanism for preventing any further inclination of the circular saw main unit beyond a point at which the plane of the saw blade is vertically disposed, the inclination stopping mechanism having an inclination stopping operating handle disposed proximate the front of the base.

12. The compound miter saw as defined by claim 11, further including an inclination stopping shaft having an axis of rotation and connecting the inclination stopping operating handle to the inclination stopping mechanism.
    a turntable locking mechanism for at least temporarily maintaining a selected rotational position of the turntable, the turntable locking mechanism having a turntable locking operating handle disposed proximate the front of the turntable and the inclination locking operating handle.

Signed and Sealed this

Twenty-fifth Day of September, 2007

JON W. DUDAS
*Director of the United States Patent and Trademark Office*